US009990640B2

(12) United States Patent
Mayer et al.

(10) Patent No.: US 9,990,640 B2
(45) Date of Patent: Jun. 5, 2018

(54) METHOD FOR DETECTING A DISCONNECTION OF THE MAIN CONNECTOR OF AN ELECTRONIC PAYMENT TERMINAL, CORRESPONDING COMPUTER PROGRAM PRODUCT, STORAGE MEANS AND PAYMENT TERMINAL

(71) Applicant: Ingenico Group, Paris (FR)

(72) Inventors: Laurent Mayer, Courdimanche (FR); Ferhaj Chowdhary, Jouy le Moutier (FR)

(73) Assignee: INGENIGO GROUP, Paris (FR)

( * ) Notice: Subject to any disclaimer, the term of this patent is extended or adjusted under 35 U.S.C. 154(b) by 0 days. days.

(21) Appl. No.: 14/955,895

(22) Filed: Dec. 1, 2015

(65) Prior Publication Data

US 2016/0155134 A1 Jun. 2, 2016

(30) Foreign Application Priority Data

Dec. 1, 2014 (FR) ..................................... 14 61732

(51) Int. Cl.
| | |
|---|---|
| *G06Q 30/00* | (2012.01) |
| *G08B 13/14* | (2006.01) |
| *G06F 21/62* | (2013.01) |
| *G06F 21/88* | (2013.01) |
| *G06Q 20/08* | (2012.01) |
| *G06Q 20/40* | (2012.01) |

(52) U.S. Cl.
CPC ..... *G06Q 30/0185* (2013.01); *G06F 21/6245* (2013.01); *G06F 21/88* (2013.01); *G06Q 20/08* (2013.01); *G06Q 20/405* (2013.01); *G08B 13/1418* (2013.01)

(58) Field of Classification Search
CPC .................................................. G08B 13/1418
USPC ......................................................... 235/380
See application file for complete search history.

(56) References Cited

U.S. PATENT DOCUMENTS

| | | | |
|---|---|---|---|
| 6,026,492 A | 2/2000 | Cromer et al. | |
| 6,067,014 A | 5/2000 | Wilson | |
| 6,111,504 A | 8/2000 | Packard et al. | |
| 2003/0229793 A1* | 12/2003 | McCall | G06Q 20/00 713/186 |
| 2011/0321173 A1* | 12/2011 | Weston | G06F 21/554 726/27 |
| 2012/0019383 A1* | 1/2012 | Fawcett | G08B 13/1463 340/568.1 |
| 2012/0132705 A1* | 5/2012 | Goluke | G06F 3/04886 235/379 |
| 2012/0280810 A1* | 11/2012 | Wheeler | G08B 13/1445 340/539.11 |

(Continued)

OTHER PUBLICATIONS

French Search Report and Written Opinion dated Mar. 20, 2015, from corresponding French Application No. 1461732, filed Dec. 1, 2014.

*Primary Examiner* — Toan Ly
(74) *Attorney, Agent, or Firm* — David D. Brush; Westman, Champlin & Koehler, P.A.

(57) ABSTRACT

A method is proposed for detecting a disconnection of a main connector of an electronic payment terminal. The method includes detecting a break in a connection control loop between a central control unit, housed in the terminal, and the main connector. In the event of a positive detection of a break, configuring the terminal in a blocked state.

10 Claims, 2 Drawing Sheets

(56) References Cited

U.S. PATENT DOCUMENTS

2014/0362517 A1* 12/2014 Moock ................ E05B 73/0082
361/679.43
2016/0026829 A1* 1/2016 Brocker .................... G06F 7/58
726/34

* cited by examiner

METHOD FOR DETECTING A DISCONNECTION OF THE MAIN CONNECTOR OF AN ELECTRONIC PAYMENT TERMINAL, CORRESPONDING COMPUTER PROGRAM PRODUCT, STORAGE MEANS AND PAYMENT TERMINAL

1. CROSS-REFERENCE TO RELATED APPLICATIONS

This Application is claims priority from and the benefit of French Patent Application No. FR 1461732, Filed Dec. 1, 2014, the content of which is incorporated herein by reference in its entirety.

2. FIELD OF THE DISCLOSURE

The disclosure pertains to the field of electronic payment terminals, and more particularly to the securing of electronic payment terminals.

More specifically, the disclosure pertains to a technique of protection against fraud and hacking into electronic payment terminals.

3. TECHNOLOGICAL BACKGROUND

Electronic payment terminals, also called EPTs, are subjected to numerous attempts at hacking or theft. Indeed, owing to the nature of the information that they contain and the sensitivity of the data that they process, a payment terminal is an object of great value for malicious individuals.

A certain type of fraud especially is tending to become widespread: this is the technique of replacing an authentic payment terminal by a fraudulent payment terminal. The authentic payment terminal is stolen from a commercial establishment and immediately replaced by a payment terminal that has an appearance of validity but has actually been modified, for example to read and copy out data from customers' bank cards so as to be able thereafter to carry out fraudulent transactions with the customer data that has already been read.

In another type of fraud, the authentic payment terminal is stolen and hacked into (both at the software and the hardware levels). Then this stolen and hacked terminal is put back in its place so that it can perform fraudulent transactions.

The unsuspecting merchant can thus easily be duped and it will be several days before he realizes that his terminal has been replaced or hacked into.

Wire-connected payment terminals, for example a terminal connected to a base, are of course more difficult to steal than mobile payment terminals but are nevertheless subject to numerous attempts at theft or replacement. These terminals are connected to a communications cable by means of a main connector. Such a main connector generally comprises at least one electrical power supply line and at least one data communications line. Since no efficient anti-theft method is proposed at present, it is relatively easy for a malicious individual to remove the connector in order to get hold of the payment terminal for purposes of hacking. The presence of locks or other anti-theft equipment calls for additional equipment, and this is not optimal and is not always dissuasive.

One way to detect the fact that an authentic payment terminal has been replaced by a fraudulent payment terminal or has been hacked into is to weigh the payment terminal daily. If the weight measured in the weighing operation is different from the original weight of the terminal, then it means that the terminal has been replaced by a fraudulent terminal or that it has been modified for the purposes of being hacked. The merchant can then be alerted to the fraud.

However, this technique does not prevent hacking into the payment terminal since it is used only to detect the fraudulent act and not to prevent it. It is therefore not very dissuasive.

It would be therefore particularly useful to be able to propose a solution so as to obtain efficient protection against fraud and hacking in electronic payment terminals.

4. SUMMARY

One particular embodiment of the disclosure proposes a method for detecting a disconnection of a main connector of an electronic payment terminal comprising the following steps:
  detecting a break in a connection control loop between a
    central control unit, housed in said terminal, and the
    main connector;
  in the event of a positive detection of a break, configuring
    said terminal in a blocked state.

Thus, an embodiment of the disclosure relies on a novel and inventive approach to combating fraud in electronic payment terminals to restrict the possibilities of misuse of the terminal by fraudulent individuals. Indeed, in the event of detection of a break in the connection control loop (indicating a disconnection of the main connector), the terminal switches into a blocked state, preventing the re-utilization of its main functions, and thus preventing any subsequent fraudulent manipulation.

An embodiment of the disclosure therefore relies on the implementing of a closed-loop control system with a closed loop between the central control unit of the terminal and the main connector, to make sure that the main connector has not been disconnected from the terminal.

According to one particular aspect of the disclosure, said step of detecting a break in a loop comprises:
  a step of sending out a test signal to the main connector;
  a step of detecting a loop feedback signal;
  said step of detecting a break in the connection control
    loop being implemented if there is no detection of the
    loop feedback signal.

If a loop feedback signal is detected, it means that the main connector is connected to the terminal; the connection control loop is closed. If no loop feedback signal is detected, it means that the connection control loop is open (with no link between the central control loop and the main connector) and therefore that the terminal is no longer connected to its main connector.

The terminal is therefore configured by default so that if a break in the control loop is detected, in other words if a disconnection of the main connector is detected without prior authorization, then such an event is considered to be a fraudulent act. Thus, an embodiment of the disclosure limits the possibility of harm by fraudulent individuals, in considering the detection of a disconnection to be a fraudulent intrusion. It must also be noted that the above-mentioned detection step can be done continuously or periodically.

If the main connector has to be disconnected, for example for maintenance work on the terminal, then it is necessary to provide for a preliminary step to deactivate the above-mentioned method for detecting disconnection in order to prevent the undesired blocking of the terminal. This aspect is dealt with in detail further below in the description, in the section providing a detailed description of one particular embodiment.

According to one particular characteristic, when said terminal is in the blocked state, the method comprises a step of transmission, to at least one remote server, of a message providing information that a disconnection of the main connector from said terminal has been detected.

Such a message alerts the remote server to the fact that there has been a fraudulent removal of the terminal. The term "remote server" is understood to mean a system for the remote management of a fleet of terminals, i.e. "terminal management system" (TMS) or a remote payment management gateway (such as the Axis gateway for example).

It is also possible to provide for a step of generating an alarm, by means of a GSM connection for example, sent towards a given station to inform the user of the terminal that there has been an attempted theft.

According to one particular characteristic the method comprises a step, should there be a positive detection of a break, of delivering a message providing information that a disconnection of the main connector of said terminal has been detected.

Such a message warns the user that a withdrawal considered to be fraudulent has just been made. This step of delivering a message can be done on the display screen of the terminal or on a remote display screen of the terminal belonging to the user, for purposes of remote control and monitoring of his terminal (the message being transmitted by means of a GSM wireless communication for example).

According to one particular characteristic, the method comprises a step, when said terminal is in the blocked state, of deactivating functions of said terminal, said functions belonging to the group comprising:
  reading an electronic payment card;
  storing data;
  setting up a communication with at least one remote server;
  setting up a transaction;
  making entries by means of a digital pad of the terminal;
  restricting messages displayed on a display screen of the terminal.

With these functions thus being deactivated, the possibilities of subsequent and potentially fraudulent use of the terminal are thus limited. It is also possible in this case to provide for sending a message to the remote server indicating that there has been a false alarm.

According to one particular advantageous characteristic, the step of detecting a break in the connection control loop is performed:
  when said terminal is in an active operating state, said terminal being supplied with energy by the main connector, or
  when said terminal is in an inactive operating state, said terminal being supplied with energy by an internal power source included in said terminal.

Thus, whether the terminal is active or inactive, it is always capable of detecting a disconnection of the main connector, which is particularly advantageous especially at night where the terminals are generally inactive. In other words, the detection of a break in the connection control loop is done even if the terminal is not electrically powered.

According to one particular advantageous characteristic, the method also comprises a step, in the event of positive detection of a break, of determining a duration of break in the connection control loop and a step of verifying that said duration of break is below a predetermined duration.

Thus, in the event of positive verification, it is assumed that there has been an involuntary disconnection of the connector, i.e. that the user having removed the connector from the terminal and then realizing that the terminal is going to get blocked, has then decided to swiftly reconnect the main connector in order to prevent the terminal from being blocked. This characteristic is particularly ingenious since it thus averts the need to implement the entire secured releasing process needed to release the terminal if all that has happened is a handling error.

According to one particular characteristic, the method furthermore comprises a step, when said terminal is in the blocked state, of configuring said terminal in a released state upon detection of at least one of the following releasing events:
  introduction via said terminal of a predetermined secret releasing code (proving that said terminal has been disconnected from the main connector by mistake);
  insertion via said terminal of at least one electronic releasing card, each associated with a secret releasing code;
  request for releasing sent remotely to said terminal from a remote server.

Thus, upon detection of one of the above-mentioned events, it is possible to reactivate the deactivated functions of the terminal. The releasing process can be done locally via the terminal or else remotely via a remote server, for example by means of a GSM wireless connection.

An embodiment of the disclosure relies on a multi-level releasing, thus making it possible to offer owners of terminals the choice of level of security and of releasing of their terminals.

The configuration step can be carried out after the main connector has been reconnected to the terminal, in other words after detection that the connection control loop is again closed.

Another embodiment of the disclosure proposes a computer program product comprising program code instructions to implement the above-mentioned method (in any one of its different embodiments), when said program is executed on a computer.

In another embodiment, a computer-readable and non-transient storage medium is proposed, storing a computer program comprising a set of instructions executable by a computer to implement the above-mentioned method (in any one of its different embodiments).

Another embodiment proposes an electronic payment terminal to which there is connected a main connector comprising:
  means for detecting a break in a connection control loop between a central control unit, housed in said terminal, and the main connector;
  means for configuring said terminal in a blocked state, activated when the detection means detect a break in the connection control loop.

Advantageously, the electronic payment terminal comprises means for implementing steps that it performs and the method of the disclosure as described here above, in any one of its different embodiments.

5. LIST OF FIGURES

Other characteristics and advantages of embodiments of the disclosure shall appear from the following description, given by way of an indicative and non-exhaustive example and from the appended figures, of which:

Figure 3:
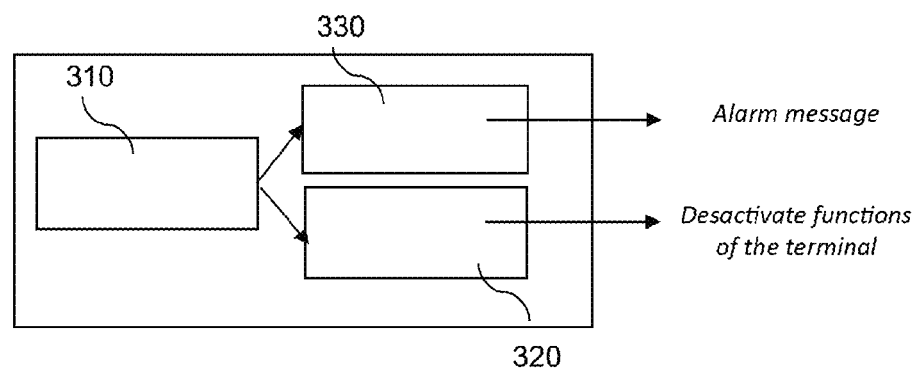
Figure 4:
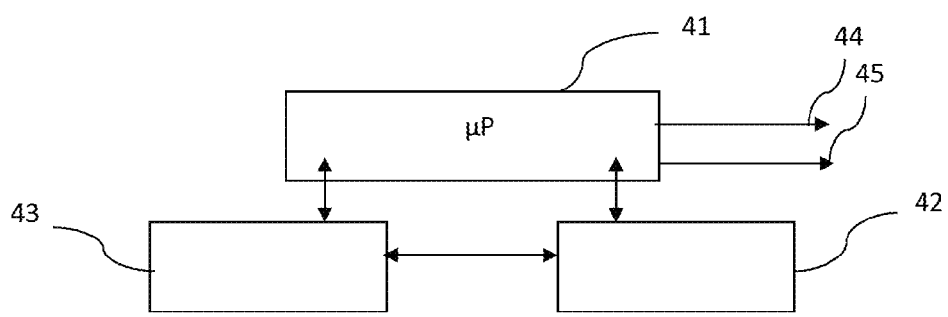

FIG. 3 presents a first example of a simplified structure of an electronic payment terminal according to one particular embodiment;

FIG. 4 presents a second example of a simplified structure of an electronic payment terminal according to one particular embodiment.

6. DETAILED DESCRIPTION

In all the figures of the present document, the identical elements and steps are designated by a same numerical reference.

Figure 1:
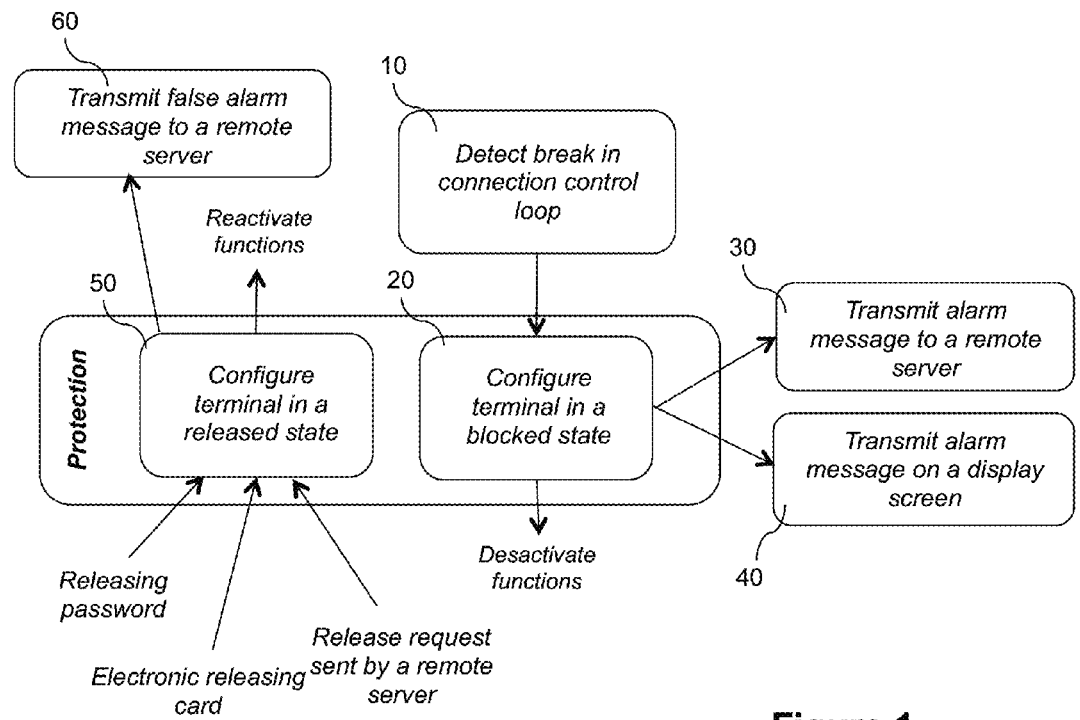
FIG. 1 is a block diagram of the proposed technique according to one particular embodiment.

FIG. 1 is a block diagram of the proposed technique according to one particular embodiment of the disclosure. This is a method for detecting a disconnection of the main connector of a wired electronic payment terminal which has the effect of protecting said terminal against fraud and hacking. The method is performed by the payment terminal itself such as the one illustrated in FIG. 2 under the numerical reference 100.

Let us take the example of the case of a payment terminal 100 located at a given sales point and intended for the performance of financial transactions with a remote server of a banking institution (not illustrated in the figures). This banking institution can manage one or more bank accounts for one or more sales points. The payment terminal 100 communicates with the remote server by means of a main communications cable 120. The payment terminal 100 is connected to the communications cable 120 by means of a main connector (or "mono-connector") 110, fixed to the end of the communications cable 120. The main connector 110 comprises connection means 115, for example arranged in the form of pins enabling the setting up of a mechanical or electrical link between the communications cable 120 and the payment terminal 110. The main connector 110 sets up input/output interfaces between the terminal 110 and the communications cable 120. The main communications cable 120 comprises for example at least one data communications line and at least one electrical power supply line.

The detection method of an embodiment of the disclosure comprises the following steps:

In a step 10, the payment terminal 100 detects a break in a connection control loop of the connection between the central control unit 150, housed in the terminal 100, and the main connector 110.

Figure 2:
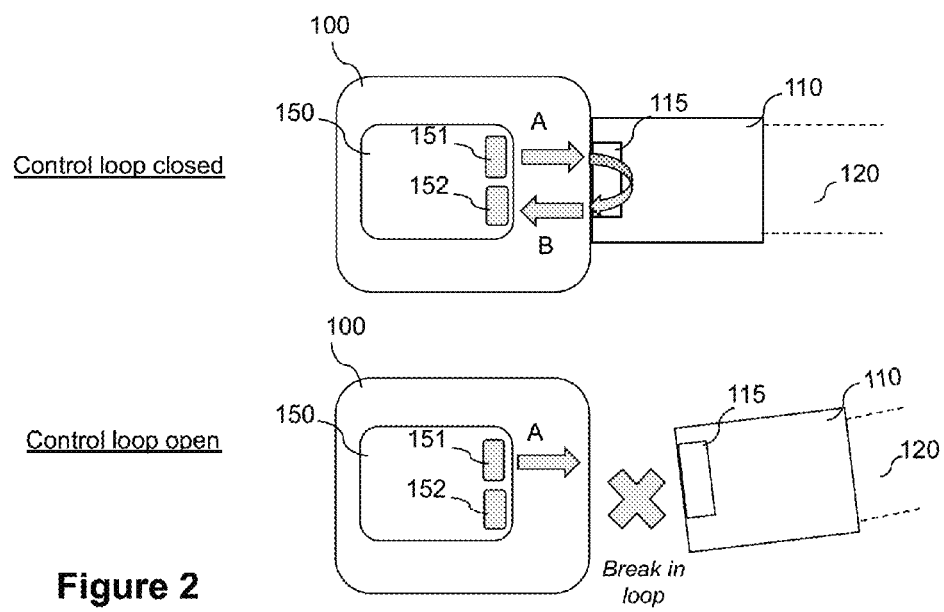
FIG. 2 is a schematic diagram showing the principle of the method illustrating the principle of the breaking of a loop according to one particular embodiment.

As illustrated in the diagrams of FIG. 2, the control loop starts from the central processing unit 150 of the terminal, passes through the central connector 110, via the connection pins 115, and returns to the central processing unit 150.

The payment terminal 100 is provided with a sending means 151 (for example an electrical signal source) configured to send out a test signal (A) to the main connector 110 and detection means 152 (for example an electrical signal detector) configured to detect a loop feedback signal (B) coming from the main connector 110. The sending means 151 and the detection means 152 are driven by the central processing unit 150. On the main connector 110 side, the connection pins 115 serve as means for reflecting the electrical signal to reflect the test signal A: the loop feedback signal B results from the reflection of the test signal on the connection pins 115.

The source 151 sends out an electrical signal of known amplitude, as a test signal A towards the main connector 110. If the main connector 110 is connected to the payment terminal 100, then the test signal A reaching the connection pins 115 of the connector 110 gets reflected on it and returns, in the form of a loop feedback signal B towards the detector 152. The fact that the loop feedback signal B is detected by the central processing unit 150 via the detector 152 signifies that the control loop is closed. If the main connector 110 is disconnected from the payment terminal 100, then no loop feedback signal can be detected by the detector 152. Thus, when there is no loop feedback signal, the central processing unit 50 detects the fact that there has been a break in the connection control loop and therefore that the terminal 100a has been disconnected from its main connector 110.

Thus, an embodiment of the disclosure relies on the application of a closed loop control system to ascertain that the main connector 110 has not been disconnected from the terminal 100.

The process for verifying a break in the connection control loop is done either continuously or periodically (every 10 seconds for example) in order to save the energy resources of the terminal 100.

In a step 20, in the event of detection of a break in the control loop, the payment terminal 100 gets configured in a blocked state, limiting the possibilities of use of said terminal. When the terminal 100 is in the blocked state, it carries out a process for deactivating the following functions:

reading an electronic payment card;
storing data;
setting of a communications link with at least one remote server;
setting up a transaction;
making entries through the numerical keypad of the terminal;
restricting messages displayed on the display screen of the terminal;
etc.

Naturally, this list of functions to be deactivated is not exhaustive. Those skilled in the art are capable of extending this list to any other function that they consider to be suited for deactivation in order to limit the risk of hacking of the electronic payment terminal.

It must be noted that the payment terminal 100 of an embodiment of the disclosure is configured so that, by default, any disconnection of the main connector without preliminary authorization is considered to be a fraudulent intrusion causing the main functions of the terminal to be inhibited in order to prevent it from being misused for purposes of fraud.

Thus, if main connector has to be disconnected, for example for maintenance work on the terminal, without in any way blocking the terminal, then it is necessary to first deactivate the above disconnection detecting method in order to prevent the undesired blocking of the terminal. A process for sending a request to deactivate the terminal blocking method according to the disclosure can be planned. This process can consist for example of a click on an icon or a button provided for this purpose (for example a "maintenance operation" icon) via the display screen of the terminal, so as to make a window appear on the screen confirming the deactivation of the process for blocking the terminal. The deactivation of the terminal blocking process can be subordinated to the introduction of a password or the insertion of a dedicated secured electronic card associated with a password. This is a purely illustrative example. Other methods for deactivating the terminal blocking process can of course be envisaged without departing from the framework of the disclosure.

Once the terminal 100 has switched into the blocked state, it proceeds in a step 30, to transmit a message to a remote server giving warning of a disconnection of the main connector 110 of the terminal. This for example can be a remote server of a remote system of a fleet of terminals (TMS or Terminal Management System) or a remote payment management gateway (a banking organization such as Axis for example). This message can furthermore include an identifier and a piece of localizing information for locating a sales point to which the terminal 100 is attached.

Once the terminal 100 has switched into the blocked state, it can also, in a step 40, deliver (or broadcast) an alarm message about a disconnection of the main connector 110 from the terminal. It can send this message directly to the display screen of the terminal 100 and/or to a remote display screen that is independent of the terminal 100, for example at a station of the user to warn him of an attempt at theft or fraud relating to the terminal 100. In this latter configuration, the delivery to a remote screen can be done by means of a GSM wireless connection.

The method can optionally also provide for a step for generating an alarm sent to a user station to inform said user of a disconnection of the main connector 110 from the terminal.

Upon detection of at least one subsequent releasing event, at the step 50, the terminal 100 passes from the blocked state to the released state with the:
  insertion of a secret releasing code via said predetermined terminal (proving that said terminal has been mistakenly disconnected from the main connector);
  insertion of at least one releasing electronic card, each associated with a secret releasing code;
  sending of a releasing request remotely to said terminal from a remote server;
  etc.

Thus, the step 50 of the method gives the user of the terminal the possibility of switching the terminal 100 back into its normal operating state (known as the released state) in a secured way. This characteristic is very practical since it offers the possibility, when the main connector 110 has been involuntarily withdrawn, of releasing the terminal and reactivating the functions of the terminal that had been disconnected at the step 20. It can be planned to execute this step of configuration in the released state either locally via the terminal 100 itself or remotely via the remote server.

Through this list of releasing events, the method offers the user of the terminal a multi-level security system, leaving him the choice of security level that he wishes according to have to his needs.

In practice, the detection of a releasing event can be done only after the main connector has been reconnected to the terminal. In other words, the terminal should have detected the fact that the connection loop is again in closed configuration (terminal connected to the main connector and therefore powered with electrical energy).

At the step 60, the terminal 100 sends a message about a false alarm to a remote server to inform it of the fact that the disconnection of the connector 10 detected preliminarily is linked only to a mishandling error and that the alarm is only a false alarm.

Finally, it must be noted that the payment terminal 100 is powered with energy by the main connector when it is in an active operating state (i.e. on) and therefore by an internal power source (a battery for example) included in the terminal 100 when it is in an inactive operating state (i.e. off). Thus, whether the terminal 100 is either active or inactive, it is always capable of detecting a disconnection of the main connector 100, and this is particularly advantageous especially at night when the terminals are generally inactive or when thefts of terminals are very frequent.

Referring to FIG. 3, a description is provided of a first example of a schematic structure of an electronic payment terminal comprising means for executing the method described here above. The electronic payment terminal comprises means (for example in the form of one or more modules) 310 for detecting a break in the connection control loop between the central control processing unit and the main connector. The terminal furthermore comprises configuration means (for example in the form of one or more modules) 320 for the configuration of the terminal in a blocked state when the detection means 310 deliver a positive result (a break in the control loop) the consequence of which is deactivate the functions of the terminal. The terminal furthermore comprises means (for example in the form of one or more modules) 330 for generating a message of alarm about the disconnection of the main terminal, when the detection means 310 deliver a positive result.

Referring to FIG. 4, a description is provided of an example of a schematic structure of a device implementing the prevention method (for example the particular embodiment described here above with reference to FIGS. 1 and 2). This device comprises a random-access memory 43 (for example a RAM), a central processing unit 41 equipped for example with a processor or microprocessor µP, and driven by a computer program stored in a read-only memory 42 (for example a ROM or a hard disk drive). At initialization, the code instructions of the computer program are for example loaded into the random-access memory 43 and then executed by the processor of the processing unit 41. Upon detection of a break in a connection control loop (detection of an absence of a loop feedback signal), the processing unit 41 configures the terminal in a blocked state, limiting possibilities of use of the terminal, and outputs a message of alarm 44 addressed to a remote server and/or to the display screen of the terminal according to the program instructions 42. Upon detection of a secured type of releasing event, the processing unit 41 configures the terminal in a released state, reactivating the functions of the terminal, and outputs a message of alarm 44 addressed to a remote server and/or to a display screen of the terminal according to the program instructions 42.

This FIG. 4 illustrates only one particular case, among several possible cases, of the performance of the different algorithms described here above with reference to FIGS. 1 and 2. Indeed, the technique of the disclosure can be carried out equally well:
  on a reprogrammable computation machine (a PC computer, a DSP processor or a microcontroller) executing a program comprising a sequence of instructions, or
  on a dedicated computing machine (for example a set of logic gates such as an FPGA or and ASIC or any other hardware module).

Should an embodiment of the disclosure be implanted on a reprogrammable computing machine, the corresponding program (i.e. the sequence of instructions) could be stored in a detachable storage medium (such as for example a floppy disk, a CD-ROM or a DVD-ROM) or not, this storage medium being partially or totally readable by a computer or a processor.

An exemplary embodiment of the disclosure provides a technique to curb fraud and the hacking of electronic payment terminals more efficiently.

An exemplary embodiment of the disclosure provides a technique of this kind that enables the detection of the fraudulent removal of an electronic payment terminal.

An exemplary embodiment of the disclosure provides a technique of this kind that is simple to implement and costs little.

Although the present disclosure has been described with reference to one or more examples, workers skilled in the art will recognize that changes may be made in form and detail without departing from the scope of the disclosure and/or the appended claims.

The invention claimed is:

1. A method comprising:
 detecting a disconnection of a main connector of an electronic payment terminal, wherein the detecting comprises:
 detecting a break in a connection control loop between a central control unit, housed in said terminal, and the main connector; and
 in the event of a positive detection of a break, configuring said terminal in a blocked state.

2. The method according to claim 1, wherein said detecting a break in the loop comprises:
 sending a test signal to the main connector;
 detecting a loop feedback signal;
 said detecting a break in the connection control loop being implemented if there is no detection of the loop feedback signal.

3. The method according to claim 1 comprising, when said terminal is in the blocked state, transmission, to at least one remote server, of a message providing information that a disconnection of the main connector from said terminal has been detected.

4. The method according to claim 1, comprising, in response to a positive detection of a break, delivering a message providing information that a disconnection of the main connector of said terminal has been detected.

5. The method according to claim 1, comprising, when said terminal is in the blocked state, deactivating functions of said terminal, said functions belonging to the group consisting of:
 reading an electronic payment card;
 storing data;
 setting up a communication with at least one remote server;
 setting up a transaction;
 making entries by means of a digital pad of the terminal;
 restricting messages displayed on a display screen of the terminal.

6. The method according to claim 1, wherein detecting a break in the connection control loop is performed:
 when said terminal is in an active operating state, said terminal being supplied with energy by the main connector, or
 when said terminal is in an inactive operating state, said terminal being supplied with energy by an internal power source included in said terminal.

7. The method according to claim 1, also comprising, in the event of positive detection of a break, determining a duration of break in the connection control loop and a step of verifying that said duration of break is below a predetermined duration.

8. The method according to claim 1, comprising, when said terminal is in the blocked state, configuring said terminal in a released state upon detection of at least one of the following releasing events:
 introduction via said terminal of a predetermined secret releasing code;
 insertion via said terminal of at least one electronic releasing card, each associated with a secret releasing code;
 request for releasing sent remotely to said terminal from a remote server.

9. A computer-readable and non-transient storage medium, storing a computer program product comprising program code instructions to implement a method when the instructions are executed on a computer of an electronic payment terminal, where in the method comprises:
 detecting a disconnection of a main connector of the electronic payment terminal, comprising:
 detecting a break in a connection control loop between a central control unit, housed in said terminal, and the main connector; and
 in the event of a positive detection of a break, configuring said terminal in a blocked state.

10. An electronic payment terminal to which there is connected a main connector, the electronic payment terminal comprising:
 means for detecting a break in a connection control loop between a central control unit, housed in said terminal, and the main connector; and
 means for configuring said terminal in a blocked state, activated when the detection means detect a break in the connection control loop.

* * * * *